(12) United States Patent
Fan et al.

(10) Patent No.: US 8,468,389 B2
(45) Date of Patent: Jun. 18, 2013

(54) FIRMWARE RECOVERY SYSTEM AND METHOD OF BASEBOARD MANAGEMENT CONTROLLER OF COMPUTING DEVICE

(75) Inventors: Cun-Hui Fan, Shenzhen (CN); Yu-Gang Zhang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 339 days.

(21) Appl. No.: 12/975,262

(22) Filed: Dec. 21, 2010

(65) Prior Publication Data
US 2012/0110378 A1  May 3, 2012

(30) Foreign Application Priority Data

Oct. 28, 2010  (CN) .......................... 2010 1 0523196

(51) Int. Cl.
*G06F 11/00*   (2006.01)

(52) U.S. Cl.
USPC .............................................. 714/15; 714/10

(58) Field of Classification Search
None
See application file for complete search history.

(56) References Cited

U.S. PATENT DOCUMENTS

| 7,631,174 | B2 * | 12/2009 | Koizumi .......................... 713/1 |
| 2004/0098521 | A1 * | 5/2004 | Lin .................................. 710/72 |
| 2007/0169088 | A1 * | 7/2007 | Lambert et al. ............... 717/168 |
| 2011/0179211 | A1 * | 7/2011 | Li et al. ......................... 710/306 |
| 2012/0110379 | A1 * | 5/2012 | Shao et al. ...................... 714/15 |

* cited by examiner

Primary Examiner — Christopher McCarthy
(74) Attorney, Agent, or Firm — Altis Law Group, Inc.

(57) ABSTRACT

A firmware recovery method of a baseboard management controller (BMC) of a computing device detects whether a firmware of a default firmware memory of the BMC is damaged by sending a detection command to the BMC at a regular interval. When the firmware of the default firmware memory of the BMC is damaged, the method recovers the firmware according to firmware data of a backup firmware memory of the BMC.

15 Claims, 3 Drawing Sheets

FIRMWARE RECOVERY SYSTEM AND METHOD OF BASEBOARD MANAGEMENT CONTROLLER OF COMPUTING DEVICE

BACKGROUND

1. Technical Field

Embodiments of the present disclosure relate generally to data recovery, and more particularly, to a firmware recovery system and method of a baseboard management controller (BMC) of a computing device.

2. Description of Related Art

A baseboard management controller (BMC) is a specialized service processor that monitors a physical state of a computing device, such as a computer, server or other computing device. The BMC is usually contained in a motherboard or main circuit board of the computing device to be monitored. A firmware of the BMC may be damaged due to various reasons. When the firmware of the BMC is damaged, firmware data of the BMC is rewritten into a firmware memory of the BMC to recover the firmware using a firmware recovery tool after the computing device is powered off. However, the firmware recovery method by powering off the computing device is inconvenient. Additionally, applications and services based on the computing device may be also interrupted due to the fact that the computing device is powered off.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
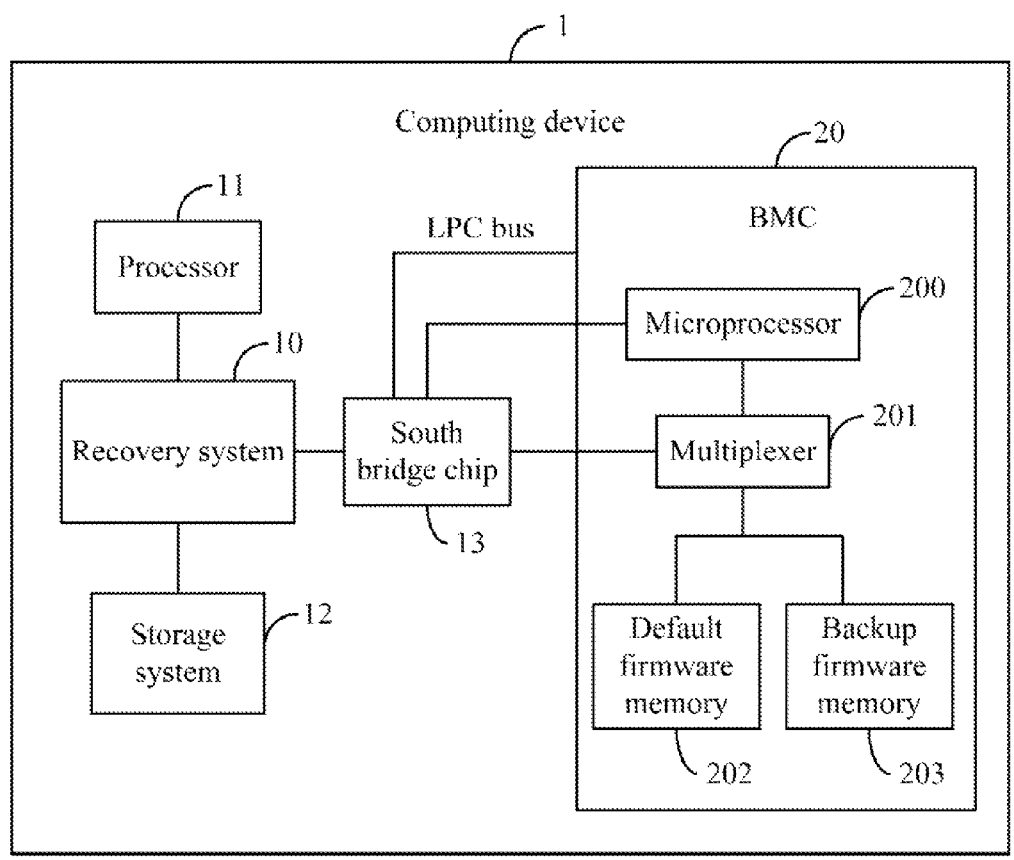
FIG. 1 is a block diagram of one embodiment of a computing device including a recovery system.

FIG. 1 is a block diagram of one embodiment of a computing device 1 including a recovery system 10. In the embodiment, the computing device 1 further includes a processor 11, a storage system 12, a south bridge chip 13, and a baseboard management controller (BMC) 20 (hereinafter referenced as "BMC 20"). The south bridge chip 13 is electronically connected with the BMC 20 through a low pin count (LPC) bus. In one embodiment, the computing device 1 may be a computer, a server, or other hardware device. It should be apparent that FIG. 1 is only one example of the computing device 1 that can be included with more or fewer components than shown in other embodiments, or a different configuration of the various components.

In one embodiment, the BMC 20 includes a microprocessor 200, a multiplexer 201, a default firmware memory 202, and a backup firmware memory 203. The microprocessor 200 may be electronically connected with the default firmware memory 202 and the backup firmware memory 203 through the multiplexer 201. The multiplexer 201 and the microprocessor 200 are electronically connected with the south bridge chip 13. The recovery system 10 may send a reset command to the microprocessor 200 through the south bridge chip 13 to reset the BMC 20, or send a control command to the multiplexer 201 to control the microprocessor 200 to electronically connect with the default firmware memory 202 or the backup firmware memory 203. In one embodiment, the multiplexer 201 and the microprocessor 200 may respectively be electronically connected with two general purpose input output (GPIO) interfaces of the south bridge chip 13.

The default firmware memory 202 and the backup firmware memory 203 may be, for example, a flash memory, a programmable read-only memory (PROM), or an electronically erasable programmable read-only memory (EPROM). Firmware data of the BMC 20 is stored in both the default firmware memory 202 and the backup firmware memory 203. When the computing device 1 is booted up, the microprocessor 200 is electronically connected with the default firmware memory 202. When the firmware of the default firmware memory 202 is damaged, the recovery system 10 may recover the firmware of the default firmware memory 202 using the firmware data of the backup firmware memory 203.

The storage system 12 stores one or more programs, such as programs of an operating system, and other applications of the computing device 1. In one embodiment, the storage system 12 may be random access memory (RAM) for temporary storage of information, and/or a read only memory (ROM) for permanent storage of information. In other embodiments, the storage system 12 may also be an external storage device, such as a hard disk, a storage card, or a data storage medium. The processor 11 executes computerized operations of the computing device 1 and other applications, to provide functions of the computing device 1.

Figure 2:
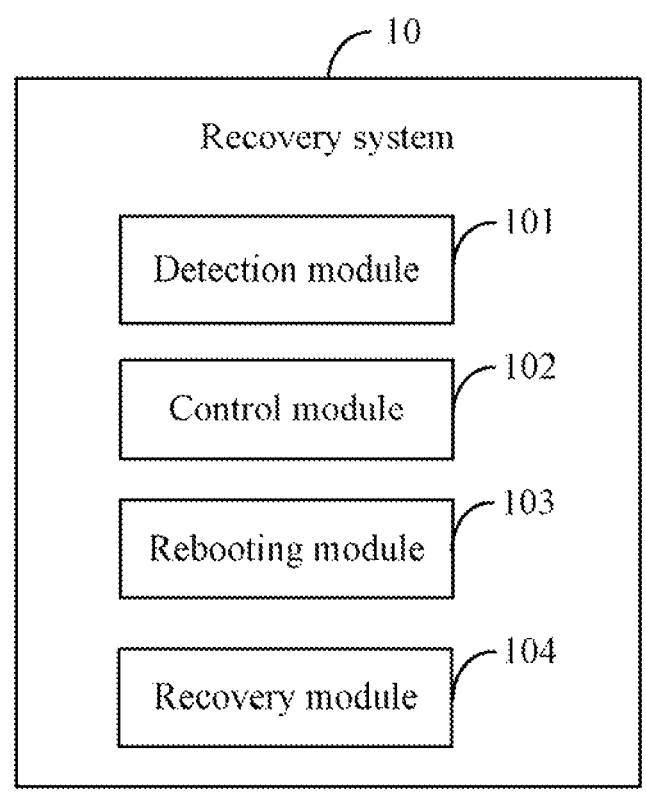
FIG. 2 is a block diagram of one embodiment of functional modules of the recovery system of FIG. 1.

FIG. 2 is a block diagram of one embodiment of functional modules of the recovery system 10. The recovery system 10 may include a plurality of functional modules comprising one or more computerized instructions that are stored in the storage system 12 or a computer-readable medium of the computing device 1, and executed by the processor 11 to perform operations of the computing device 1. In one embodiment, the recovery system 10 includes a detection module 101, a control module 102, a rebooting module 103, and a recovery module 104. In general, the word "module", as used herein, refers to logic embodied in hardware or firmware, or to a collection of software instructions, written in a programming language, such as, Java, C, or Assembly. One or more software instructions in the modules may be embedded in firmware, such as EPROM. The modules described herein may be implemented as either software and/or hardware modules and may be stored in any type of computer-readable medium or other storage device.

The detection module 101 is operable to send a detection command to the BMC 20 at a regular interval to detect whether the firmware of the default firmware memory 202 is damaged. Upon the condition that the firmware of the default firmware memory 202 is not damaged, the BMC 20 may return response information when the detection command is received. If the detection module 101 does not receive the response information from the BMC 20 after the detection command is sent to the BMC 20 twice or more times, the detection module 101 may determine that the firmware of the default firmware memory 202 is damaged. In the embodiment, the regular interval is greater than a time of rebooting the firmware of the default firmware memory 202, because the BMC 20 cannot respond to the detection command during the time of rebooting the firmware of the default firmware memory 202.

The control module 102 is operable to send a first control command to the multiplexer 201 to control the backup firmware memory 203 to electronically connect with the microprocessor 200 when the firmware of the default firmware memory 202 is damaged.

The rebooting module 103 is operable to reboot the BMC by sending a reset command to the microprocessor 200 through the south bridge chip 13 when the backup firmware memory 203 is electronically connected with the microprocessor 200.

The recovery module 104 is operable to read the firmware data of the backup firmware memory 203 into a memory space of the microprocessor 200 when the BMC 20 is booted up. In one embodiment, the microprocessor 200 may include a local addressable memory, such as a static random access memory (SRAM). The memory space may be a storage space of the addressable memory.

The control module 102 is further operable to send a second control command to the multiplexer 201 to control the default firmware memory 202 to electronically connect with the microprocessor 200, when the firmware data of the backup firmware memory 203 is read into the memory space of the microprocessor 200.

The recovery module 104 is further operable to recover the firmware of the default firmware memory 202 by writing the firmware data from the memory space of the microprocessor 200 into the default firmware memory 202. When the firmware of the default firmware memory 202 is recovered, the BMC 20 may execute the firmware of the default firmware memory 202 to provide functions of the BMC 20.

Figure 3:
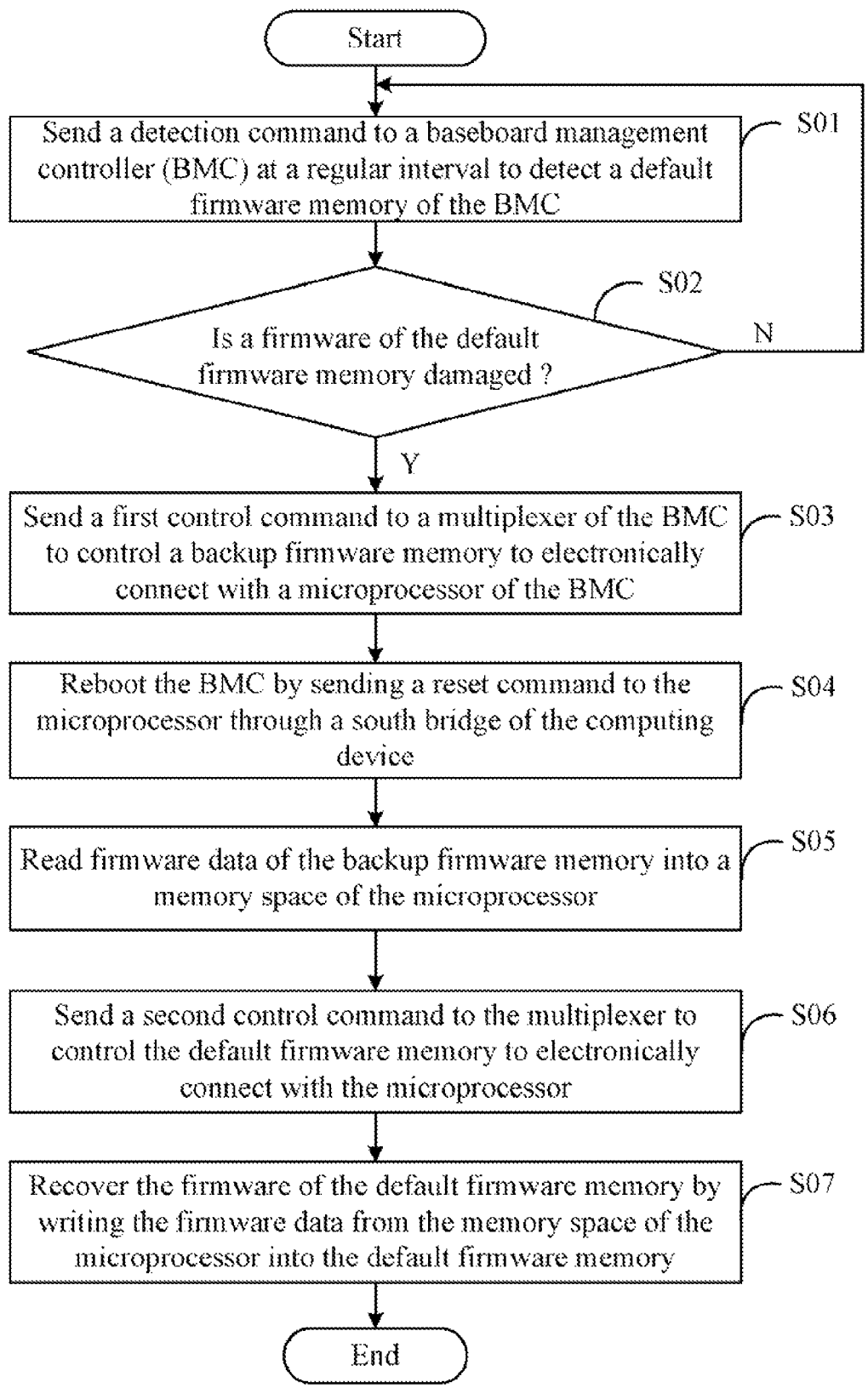
FIG. 3 is a flowchart of one embodiment of a firmware recovery method of a baseboard management controller of the computing device of FIG. 1.

FIG. 3 is a flowchart of one embodiment of a firmware recovery method of the BMC 20 of the computing device 1 of FIG. 1. Depending on the embodiment, additional blocks may be added, others removed, and the ordering of the blocks, may be changed.

In block S01, the detection module 101 sends a detection command to the BMC 20 at a regular interval to detect a firmware of the default firmware memory 202. In block S02, the detection module 101 determines whether the firmware of the default firmware memory 202 is damaged. If the firmware of the default firmware memory 202 is damaged, block S03 is implemented. Otherwise, if the firmware of the default firmware memory 202 is not damaged, block S01 is repeated. The detection module 103 may detect whether the firmware of the default firmware memory 202 is damaged as described above.

In block S03, the control module 102 sends a first control command to the multiplexer 201 to control the backup firmware memory 203 to electronically connect with the microprocessor 200.

In block S04, the rebooting module 103 reboots the BMC 20 by sending a reset command to the microprocessor 200 through the south bridge chip 13.

In block S05, the recovery module 104 reads firmware data of the backup firmware memory 203 into a memory space of the microprocessor 200 when the BMC 20 is booted up.

In block S06, the control module 102 sends a second control command to the multiplexer 201 to control the default firmware memory 202 to electronically connect with the microprocessor 200.

In block S07, the recovery module 104 recovers the firmware of the default firmware memory 202 by writing the firmware data from the memory space of the microprocessor 200 into the default firmware memory 202. When the firmware of the default firmware memory 202 is recovered, the BMC 20 may execute the firmware from the default firmware memory 202 to perform operations.

Although certain embodiments of the present disclosure have been specifically described, the present disclosure is not to be construed as being limited thereto. Various changes or modifications may be made to the present disclosure without departing from the scope and spirit of the present disclosure.

What is claimed is:

1. A firmware recovery method of a baseboard management controller (BMC) of a computing device, the method comprising:
    sending a detection command to the BMC at a regular interval to detect whether the firmware of a default firmware memory of the BMC is damaged;
    sending a first control command to a multiplexer of the BMC to control a backup firmware memory of the BMC to electronically connect with a microprocessor of the BMC through the multiplexer, when the firmware of the default firmware memory is damaged;
    rebooting the BMC by sending a reset command to the microprocessor through a south bridge chip of the computing device;
    reading firmware data of the backup firmware memory into a memory space of the microprocessor when the BMC is booted up;
    sending a second control command to the multiplexer to control the default firmware memory to electronically connect with the microprocessor; and
    recovering the firmware of the default firmware memory by writing the firmware data from the memory space of the microprocessor into the default firmware memory.

2. The method according to claim 1, wherein the microprocessor is electronically connected with the default firmware memory through the multiplexer when the computing device is booted up.

3. The method according to claim 1, wherein the default firmware memory or the backup firmware memory is a flash memory, a programmable read-only memory, or an electronically erasable programmable read-only memory.

4. The method according to claim 1, wherein the regular interval is greater than a time of rebooting the firmware of the default firmware memory.

5. The method according to claim 1, wherein the computing device is a computer or a server.

6. A computing device, comprising:
    a baseboard management controller (BMC), the BMC comprising a microprocessor, a multiplexer, a default firmware memory, and a backup firmware memory;
    at least one processor;
    a storage system; and
    one or more programs stored in the storage system and being executable by the at least one processor, the one or more programs comprising:
    a detection module operable to send a detection command to the BMC at a regular interval to detect whether the firmware of the default firmware memory is damaged;
    a control module operable to send a first control command to the multiplexer to control the backup firmware memory to electronically connect with the microprocessor of the BMC through the multiplexer, when the firmware of the default firmware memory is damaged;
    a rebooting module operable to reboot the BMC by sending a reset command to the microprocessor through a south bridge chip of the computing device when the backup firmware memory is electronically connected with the microprocessor;
    a recovery module operable to read firmware data of the backup firmware memory into a memory space of the microprocessor when the BMC is booted up;
    the control module further operable to send a second control command to the multiplexer to control the default firmware memory to electronically connect with the microprocessor when the firmware data of the backup firmware memory is read into the memory space of the microprocessor; and the recovery module further operable recover the firmware of the default firmware memory by writing the firmware data from the memory space of the microprocessor into the default firmware memory.

7. The computing device according to claim 6, wherein the microprocessor is electronically connected with the default firmware memory through the multiplexer when the computing device is booted up.

8. The computing device according to claim 6, wherein the default firmware memory or the backup firmware memory is a flash memory, a programmable read-only memory, or an electronically erasable programmable read-only memory.

9. The computing device according to claim 6, wherein the regular interval is greater than a time of rebooting the firmware of the default firmware memory of the BMC.

10. The computing device according to claim 6, wherein the computing device is a computer or a server.

11. A non-transitory storage medium storing a set of instructions, the set of instructions capable of being executed by a processor of a computer to perform a firmware recovery method of a baseboard management controller (BMC) of a computing device, the method comprising:

sending a detection command to the BMC at a regular interval to detect whether the firmware of a default firmware memory of the BMC is damaged;

sending a first control command to a multiplexer of the BMC to control a backup firmware memory of the BMC to electronically connect with a microprocessor of the BMC through the multiplexer, when the firmware of the default firmware memory is damaged;

rebooting the BMC by sending a reset command to the microprocessor through a south bridge chip of the computing device;

reading firmware data of the backup firmware memory into a memory space of the microprocessor when the BMC is booted up;

sending a second control command to the multiplexer to control the default firmware memory to electronically connect with the microprocessor; and recovering the firmware of the default firmware memory by writing the firmware data from the memory space of the microprocessor into the default firmware memory.

12. The non-transitory storage medium as claimed in claim 11, wherein the microprocessor is electronically connected with the default firmware memory through the multiplexer when the computing device is booted up.

13. The non-transitory storage medium as claimed in claim 11, wherein the default firmware memory or the backup firmware memory is a flash memory, a programmable read-only memory, or an electronically erasable programmable read-only memory.

14. The non-transitory storage medium as claimed in claim 11, wherein the regular interval is greater than a time of rebooting the firmware of the default firmware memory.

15. The non-transitory storage medium as claimed in claim 11, wherein the computing device is a computer or a server.

* * * * *